United States Patent

[11] 3,593,087

[72] Inventors Thomas Pantelakis
Margate;
Dudley D. Nye, Jr., Fort Lauderdale, both of, Fla.
[21] Appl. No. 837,457
[22] Filed June 30, 1969
[45] Patented July 13, 1971
[73] Assignee Borg-Warner Corporation
Chicago, Ill.

[54] MOTOR CONTROL SYSTEM WITH DOUBLE IR COMPENSATION
8 Claims, 3 Drawing Figs.
[52] U.S. Cl. .................................................. 318/345, 318/331
[51] Int. Cl. ................................................... H02p 5/16
[50] Field of Search ...................................... 318/331, 345

[56] References Cited
UNITED STATES PATENTS

| | | | | |
|---|---|---|---|---|
| 2,855,554 | 10/1958 | Conger | | 318/331 |
| 3,181,050 | 4/1965 | Berman | | 318/331 |
| 3,311,806 | 3/1967 | Charlwood | | 318/331 |
| 3,447,055 | 5/1969 | Mason | | 318/331 |

Primary Examiner—Oris L. Rader
Assistant Examiner—Thomas Langer
Attorneys—Donald W. Banner, William S. McCurry and John W. Butcher ABSTRACT: A DC motor control system is energized by semiconductor switches controlled by firing circuits. A control amplifier is connected to regulate the firing circuits and to energize the motor as a function of the armature terminal voltage, motor speed control setting, average current flow through the armature, and average current flow through the semiconductor switches.

Inventors
Thomas Pantelakis
Dudley D. Nye, Jr.

By James J. Jennings, Jr.
Attorney

3,593,087

MOTOR CONTROL SYSTEM WITH DOUBLE IR COMPENSATION

BACKGROUND OF THE INVENTION

In the field of DC motor control, it is known to use IR compensation in an attempt to maintain approximately the desired motor speed over the operating range of the motor. In practice, it is difficult to obtain a signal truly proportional to the armature voltage, because the voltage measured at the motor terminals is the sum of the true armature voltage plus the voltage dropped across the series resistance of the armature. Motor speed is a function of the true armature voltage, and the voltage drop across the series resistance distorts the speed information available by measuring the motor terminal voltage. Accordingly, there is a need for IR compensation to minimize the effect of this distortion and improve the speed information.

In the past, such IR compensation circuits have generally been connected to vary with the motor armature current, which in turn, is a function of the load on the motor. With such an arrangement at any given motor speed the compensation can be regulated so that it is precisely "on" the right speed, or under-compensated, or over-compensated. With practical motors and circuits, however, it is not possible to maintain the same precision of compensation over the entire speed range of the motor.

It is, therefore, a principal consideration of the invention to provide a motor control circuit with an improved IR compensation arrangement which substantially enhances the speed regulation over the entire operating range.

SUMMARY OF THE INVENTION

An energizing system for an electrical motor constructed in accordance with the inventive teaching passes electrical energy to the motor by a power circuit which includes at least one semiconductor switch. The system comprises a control amplifier which has an input circuit and an output circuit. A circuit which includes the control amplifier output circuit is connected to regulate operation of the semiconductor switch, and thus regulate energization of the motor. Means is provided for applying a signal related to the motor terminal voltage to the input circuit of the control amplifier. Means is also provided for deriving first and second IR compensation signals. The first IR compensation signal is related to the current flow through the motor armature. In accordance with this invention, the second IR compensation signal is related to the current flow either through the semiconductor switch or through a freewheeling diode. The first and second IR compensation signals are applied to the input circuit of the control amplifier. Over the motor speed range, the combination of the second IR compensation signal with the first IR compensation signal improves the regulation of the motor energizing system.

THE DRAWINGS

In the several figures of the drawings, like reference numerals identify like elements, and in the drawings:

FIG. 1 is a block diagram, partly in schematic form, depicting this invention incorporated in a motor energizing system; and FIG. 2 is a schematic diagram illustrating the circuit details of the control amplifier shown more generally in FIG. 1.

DETAILED DESCRIPTION OF THE INVENTION

Figure 1:
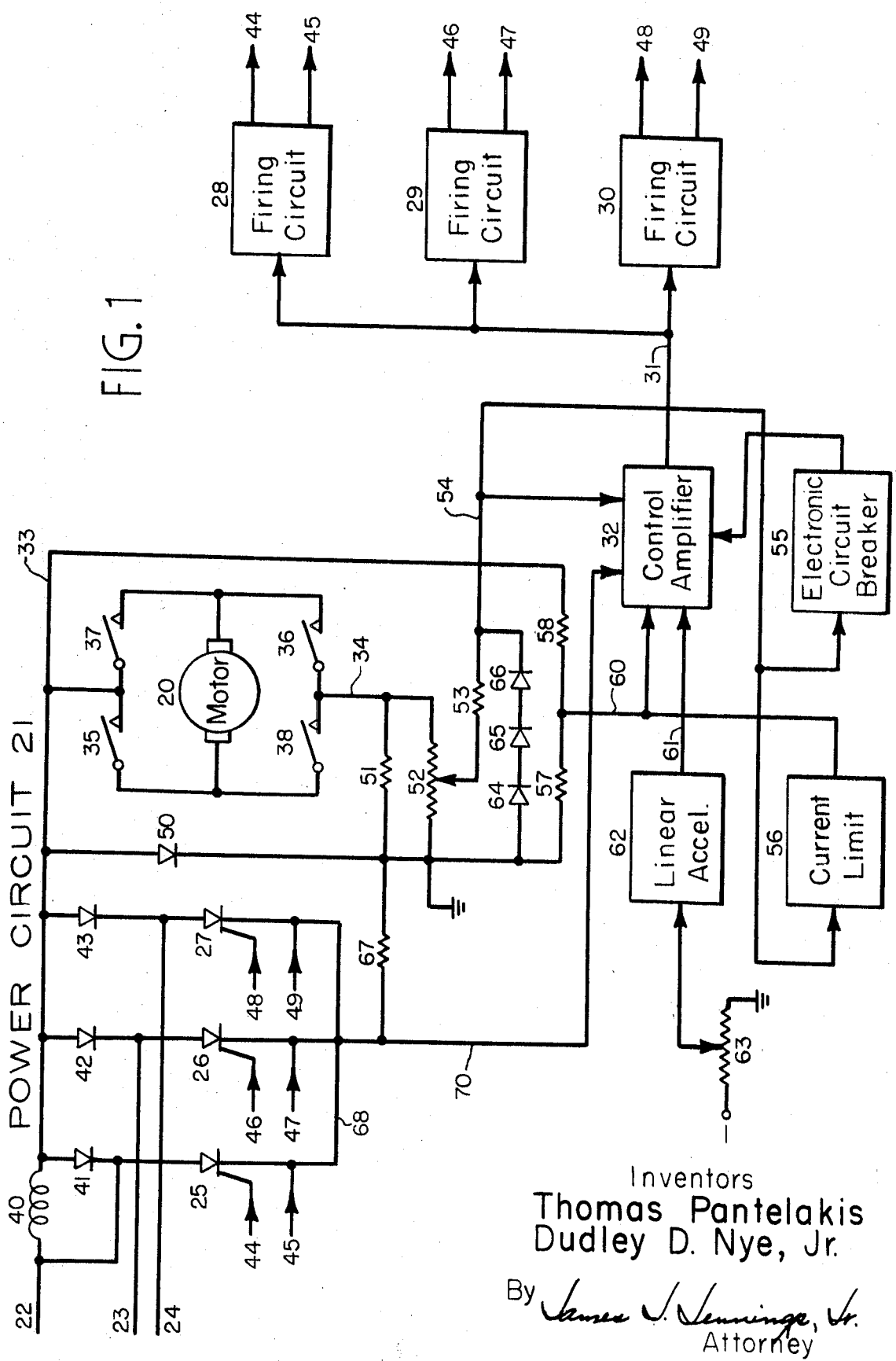

FIG. 1 depicts a motor energizing system in which the armature circuit of a motor 20 receives energy from a power circuit 21 which, in turn, is supplied with three-phase AC energy over three input conductors 22, 23 and 24. The level of energy passed to the motor is determined by the conduction times of semiconductor switches or silicon controlled rectifiers (SCR's) 25, 26 and 27 which, in turn, are regulated by gating signals provided by firing circuits 28, 29 and 30. The firing circuits are regulated by an output signal received over circuit 31 from a control amplifier 32, which operates in response to different input signals.

Motor 20 is energized as DC energy is passed through power circuit 21 and applied between conductors 33 and 34. When switches 35 and 36 are closed, current flows through motor 20 in a first direction and effects motor rotation in a given angular direction. When switches 35, 36 are opened and switches 37, 38 are closed (by control components which are not illustrated because they are well known), current flows through motor 20 in the opposite direction and effects motor rotation in the opposite angular direction.

Motor field winding 40 is coupled between conductors 22 and 33. Three diodes 41, 42 and 43 are respectively coupled in series with the semiconductor switches 25, 26 and 27. The input conductors 22–24 are respectively connected to the common connections between each diode-SCR pair. Although the semiconductor switches 25–27 are illustrated as silicon controlled rectifiers, other components such as thyratrons, ignitrons, power transistors, transistors, electron-discharge devices and similar switching units can be used in their place. In another method, only one semiconductor switch is required to regulate the level of motor energization. Such switch can be coupled in a series circuit connection, in a "chopper" or DC-to-DC converter arrangement, in lieu of the illustrated three-phase rectifier arrangement. Silicon controlled rectifier 25 receives gating signals over conductors 44, 45 from firing circuit 28; SCR 26 receives gating signals over conductors 46 and 47 from firing circuit 29; and SCR 27 receives firing signals over conductors 48, 49 from firing circuit 30. Thus, the conduction level, or on time, of the SCR's 25–27 determine the level of the voltage applied between conductors 33, 34 to energize motor 20 as the appropriate switch pair 35, 36 or 37, 38 is closed.

A "freewheeling" diode 50 is coupled between conductor 33 and circuit common, or ground. Because of the inductive reactance of the motor, the turnoff of a given silicon controlled rectifier may terminate current supply while the motor tends to keep current flowing; the freewheeling diode 50 maintains a path for the continuing current flow. A resistor 51 is coupled between conductor 34 and ground. A potentiometer 52 is coupled between conductor 34 and ground, and the movable arm is coupled over a resistor 53 to a common conductor 54 which, in turn, is coupled to control amplifier 32, an electronic circuit breaker 55, and a current limit stage 56. The stages 55 and 56 are illustrated to give an overall perspective of the motor energizing system, but are not necessary to an understanding of the present invention. For purposes of this explanation, conductor 54, together with resistor 53, a portion of potentiometer 52, and resistor 51, can be considered as means for providing a first IR compensation signal, related to the current flow through the motor armature, for application to the control amplifier stage 32.

A pair of resistors 57, 58 are coupled in series between conductor 33 and ground, and conductor 60 is coupled between the midpoint of these two resistors and a first input connection of control amplifier 32. Conductor 60 is also coupled to current limit stage 56. From the illustrated circuit arrangement it is evident that conductor 60, with resistors 57 and 58, represents means for applying a signal related to the terminal voltage of motor 20 to the first input connection of control amplifier stage 32.

The control amplifier also receives a speed reference signal over line 61 from a linear acceleration stage 62 shown receiving an input signal from the movable arm of a potentiometer 63. Linear acceleration stage 62 is utilized to translate a step function change of the setting of potentiometer 63 into a gradual, smooth transition of a speed control signal applied over line 61 to the control amplifier stage 32.

Three diodes 64, 65 and 66 are coupled in series between conductor 54 and ground to protect against an unduly large signal being passed over conductor 54 to the amplifier stage if resistor 51 were to open, or if for some other reason an excess of current were to be suddenly supplied over resistor 53.

Particularly in accordance with the present invention, a resistor 67 is coupled between ground and a common conductor 68 coupled to the cathodes of all the semiconductor switches 25, 26 and 27. Conductor 70 is coupled to the common connection of resistor 67 and common conductor 68, and is also coupled to control stage 32. Thus, conductor 70 represents means for applying to the control amplifier stage a second IR compensation signal which is related to the current flow through semiconductor switches 25–27. It is clear that as the motor speed increases, the conduction times of switches 25–27 correspondingly increases and the level of the signal provided on conductor 70 also increases. This second IR compensation signal, on conductor 70, is positive-going as compared to the negative-going first IR compensation signal on conductor 54. Accordingly, an increasing portion of the first IR compensation signal on conductor 54 is cancelled as the motor speed increases, to enhance the system regulation over the entire motor speed range. This occurs since, with a given torque, the contribution of the freewheeling diode to armature current becomes less as the speed is increased.

Figure 2:
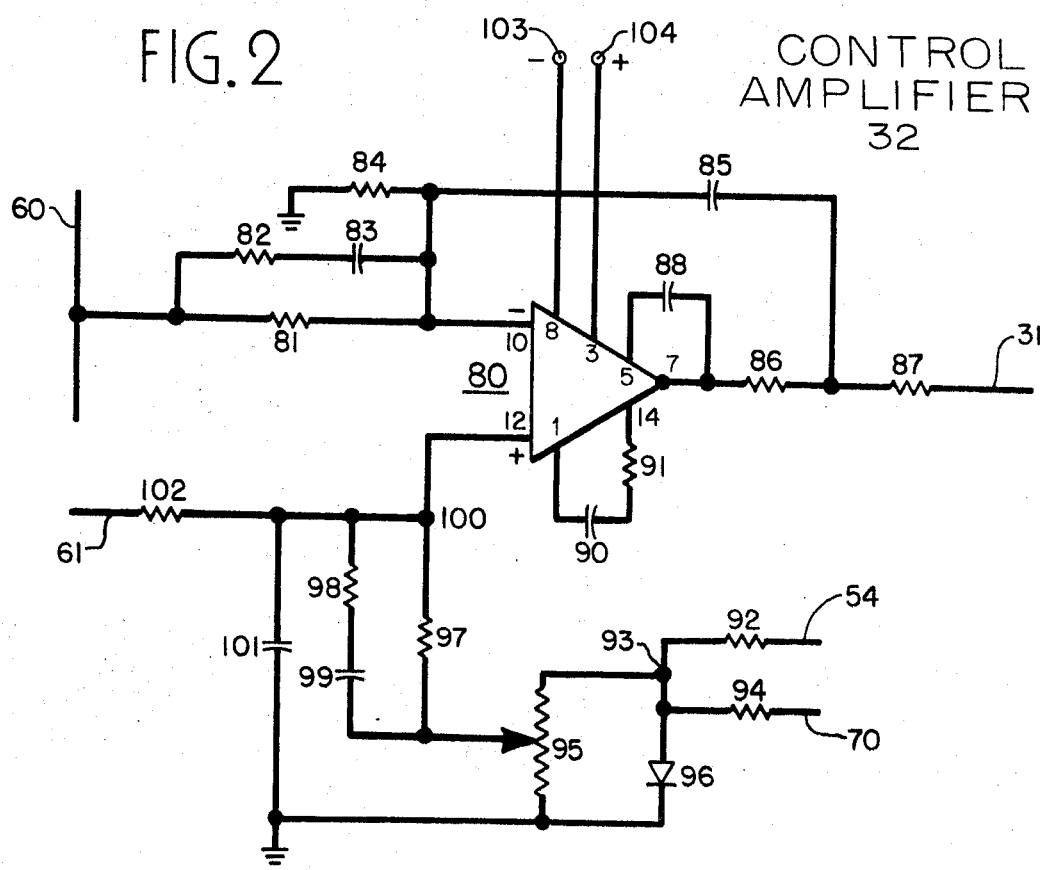

Considering now the control amplifier stage 32, schematic details of this unit are depicted in FIG. 2. As shown, a salient component of the control amplifier stage is an operational amplifier (op amp) 80. Various terminals are numbered within the schematic representation of FIG. 2, except for output terminal 7 which is referenced externally, to facilitate practice of the invention by those skilled in the art.

Conductor 60, on which the signal related to the motor terminal voltage is provided, is coupled over a resistor 81 to the first input connection 10 of op amp 80. A series circuit comprising resistor 82 and capacitor 83 is coupled in parallel with the resistor 81. Another resistor 84 is coupled between first input connection 10 and ground. A first feedback capacitor 85 is coupled between first input connection 10 and the common connection between a pair of series-connected output resistors 86, 87, shown coupled between output connection 7 of the op amp and conductor 31. Op-amp stabilizing components include a first capacitor 88 coupled between output connection 7 and connection 5, and a series circuit comprising capacitor 90 and resistor 91 coupled between connections 1 and 14.

The first (conventional) IR compensation signal is applied over conductor 54 and resistor 92 to common connection 93. The second IR compensation signal, provided in accordance with this invention, is applied over conductor 70 and resistor 94 to common connection 93. A potentiometer 95 for adjusting the extent of the IR compensation applied to op amp 80 is coupled between terminal 93 and ground. A protective means, depicted as a diode 96, is coupled between common connection 93 and ground to prevent any sudden surge of signal voltage from the IR compensation circuits, of a level which would damage the op amp, from being applied to the input connection of op amp 80. For purposes of this explanation, resistors 92 and 94 can be considered as means for summing the first and second IR compensation signals for subsequent application over a portion of potentiometer 95 and the series-coupled resistor 97 to the second input connection 12 of op amp 80.

A series circuit including a resistor 98 and a capacitor 99 is coupled in parallel with resistor 97 between common connection 100 and the movable arm of potentiometer 95. A capacitor 101 is coupled between common connection 100 and ground, and a resistor 102 is coupled between input conductor 61 and common connection 100. In that potentiometer 63 (FIG. 1) represents a means for providing a speed reference signal, which is applied over linear acceleration stage 62 to conductor 61, resistors 102 and 97 effectively combine the resultant sum signal at connection 93 with the speed reference signal over conductor 61, and produce a composite summation signal at common connection 100 for application to the second input connection of the operational amplifier.

Although first input connection 10 is referenced with a minus sign, and a positive sign characterizes second input connection 12, it is to be understood that these signs refer to the sense of the feedback signals (reinforcing or offsetting rather than the polarities of the input signals. In the illustrated embodiment a negative polarity signal related to the terminal voltage of the motor armature is received over conductor 60, and the speed reference signal on conductor 61 was also negative. The first IR compensation signal on conductor 54 was negative relative to the common or ground reference conductor, and the second IR compensation signal on conductor 70 was positive. It is apparent from inspection of FIG. 1 that the first IR compensation signal is a function of the average current flow through the motor armature, whereas the second IR compensation signal is a function of the average current flow through semiconductor switches 25–27. At low motor speeds, with a given torque, the SCR's conduct less and thus the positive IR signal on conductor 70 does not cancel or offset a very large portion of the negative IR signal on conductor 54. However, as the motor speed increases, the conduction times of the SCR's correspondingly increase and the contribution of freewheeling diode current to armature current decreases to increase the amplitude of the positive IR compensation signal on conductor 70, thereby cancelling an increasing portion of the negative IR compensation signal on conductor 54. It is this gradual variation of the second IR compensation signal on conductor 70, and its combination with the first IR compensation signal on conductor 54, which significantly contributes to the enhanced regulation of the system over the entire speed range.

Incorporation of operational amplifier 80 in control amplifier stage 32 also contributes significantly to the improvement obtained with this invention. Because of the high gain of op amp 80, only a negligible difference between the input signals at terminals 10 and 12 is necessary to provide an output signal at output connection 7 of the op amp. In addition, the null stability of the op amp permits utilizing relatively low signal voltages, such as 1 volt, to provide a full scale speed signal on output conductor 61 and less than 0.1 volt at common connection 93 for IR compensation. For this reason the power dissipation in IR resistors 51 and 67 is exceptionally low compared to the amount of power dissipated in other equipment now commercially available.

By way of illustration only and in no sense by way of limitation, a table of values for the components of FIG. 2 is set out below to assist those skilled in the art to practice the invention with a minimum of experimentation. With the illustrated circuit, op amp 80 was a GE type PA–238. A negative 6 volt potential relative to ground was applied to terminal 103 and terminal 8 of the op amp, and a positive 6 volt potential was applied over terminal 104 to terminal 3 of the op amp. The other circuit components were:

COMPONENTS AND VALUES

| | |
|---|---|
| 96 | GE 1N5059 |
| 83, 99 | 10 mfd., ± 20%, 6 vDC |
| 85 | 1.0 mfd., ± 20%, 250 vDC |
| 88 | 47 pfd., ± 10%, 500 vDC |
| 90 | 1,000 pfd., ± 20%, 100 vDC |
| 101 | 0.047 mfd., ± 10%, 250 vDC |
| 81, 84, 97, 102 | 15 K ohms, ± 1% |
| 82 | 6.8 K ohms, ± 5% |
| 86 | 402 ohms, ± 1% |
| 87 | 1 K ohms, ± 1% |
| 91 | 390 ohms, ± 10% |
| 92 | 47 ohms, ± 5% |
| 94 | 180 ohms, ± 5% |
| 95 | 500 ohms, ± 20% |
| 98 | 10 K ohms, ± 5% |

Figure 3:
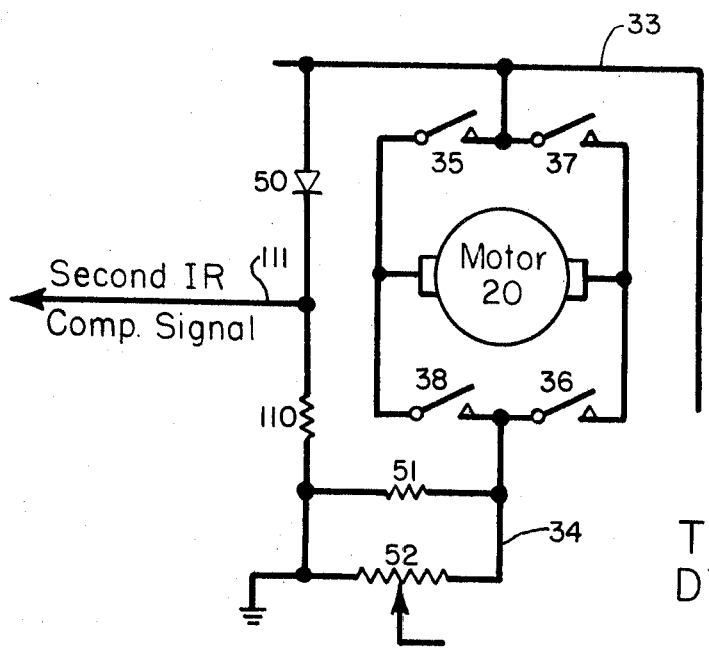

An alternate method of double IR compensation may be effected by eliminating resistor 67, shown in FIG. 1, and connecting a resistor 110, as shown in FIG. 3, in series with the cathode of freewheeling diode 50 to provide the second IR compensation signal. With the arrangement depicted in FIG. 3, the freewheeling diode current increases, with torque being held constant, when the motor speed is reduced. When the positive polarity signal from IR sensing resistor 110 is summed by application to the other input terminal of op amp 80 to reinforce and increase the main IR compensation over conductor 54, and improved overall load compensation is obtained. The arrangement of FIG. 3 provides an improvement essentially equivalent to the circuit arrangement in FIG. 1. However, with the arrangement of FIG. 3 it is necessary to utilize relatively small signals for IR compensation and for the reference or set point of the control amplifier stage, in order to keep the voltage drop across sensing resistor 110 small. With this arrangement large overloads or rotor jam ups may cause the drop across the sensing resistor to be sufficiently high so as to interfere with proper commutation of the SCR's 25-27. Thus although the improved compensation described above is obtained with the arrangement of FIG. 3, at this time the circuit shown in FIGS. 1 and 2 is the preferred arrangement for practicing the invention.

Although only a particular embodiment of the invention has been described and illustrated, it is apparent that various modifications and alterations may be made therein. It is therefore the intention in the appended claims to cover all such modifications and alterations as may fall within the true spirit and scope of the invention.

What we claim is:

1. An energizing system for an electrical motor in which electrical energy is passed to the motor by a power circuit including at least one semiconductor switch, comprising:
    a control amplifier having an input circuit and an output circuit,
    means, including the control amplifier output circuit, connected to regulate operation of the semiconductor switch and thus regulate energization of said motor,
    means for applying to the control amplifier input circuit a signal related to the motor terminal voltage,
    means for providing a first IR compensation signal related to the current flow through the motor armature,
    means for providing a second IR compensation signal related to a current flow which varies as a function of the operation of said semiconductor switch, and
    means for applying the first and second IR compensation signals to the input circuit of the control amplifier, to enhance the regulation over the entire motor speed range.

2. A motor energizing system as claimed in claim 1, in which said means for providing the second IR compensation signal includes a resistor, connected to provide a signal related to the current flow through said semiconductor switch, and means for summing the first and second IR compensation signals and for applying the resultant sum signal to the input circuit of the control amplifier.

3. A motor energizing system as claimed in claim 2 in which said control amplifier includes an operational amplifier having first and second input connections and an output connection, means for coupling said output connections to the circuit which regulates operation of the semiconductor switch, means for applying said signal related to the motor terminal voltage to the first input connection of the operational amplifier, and means for applying said resultant sum signal to the second input connection of the operational amplifier.

4. A motor energizing system as claimed in claim 1 in which a freewheeling diode is coupled in parallel with the motor to complete a continuous path for current flow when the semiconductor switch is turned off, and in which said means for providing the second IR compensation signal includes a resistor, coupled in series with said freewheeling diode, to provide a signal related to the current flow through the freewheeling diode.

5. An energizing system as claimed in claim 3 and further comprising means for providing a speed reference signal, and means for combining said speed reference signal with said resultant sum signal to produce a composite summation signal for application to the second input connection of the control amplifier.

6. An energizing system for an electrical motor in which electrical energy is passed to the motor by a power circuit including at least one semiconductor power switch regulated by a firing circuit, comprising:
    a control amplifier stage, including an operational amplifier having first and second input connections and an output connection;
    means for coupling the operational amplifier output connection to said firing circuit to regulate operation of said firing circuit and thus regulate energization of said motor;
    means for applying a signal related to the motor terminal voltage to the first input connection of the operational amplifier;
    means for providing a first IR compensation signal related to the current flow through the motor armature;
    means for providing a second IR compensation signal related to the current flow through the semiconductor switch; and
    means for summing the first and second IR compensation signals and for applying the resultant sum signal to the second input connection of the operational amplifier, such that the second IR compensation signal cancels an increasing portion of the first IR compensation signal as the motor speed increases to enhance the regulation over the entire motor speed range.

7. An energizing system as claimed in claim 6 and further comprising means for providing a speed reference signal, and means for combining said resultant sum signal with said speed reference signal to produce a composite summation signal for application to the second input connection of the operational amplifier.

8. An energizing system as claimed in claim 6 and further comprising protective means, coupled between ground and the means for summing the first and second IR compensation signals, to protect the operational amplifier against damage by excess values of the resultant sum signal.